United States Patent Office 3,088,966
Patented May 7, 1963

3,088,966
PHOSPHORAMIDATES AND PHOSPHOR-AMIDOTHIOATES
Herman O. Senkbeil, Midland, Mich., assignor to The Dow Chemical Company, Midland, Mich., a corporation of Delaware
No Drawing. Filed July 6, 1961, Ser. No. 122,100
7 Claims. (Cl. 260—461)

The present invention is directed to phosphoramidates and phosphoramidothioates corresponding to the formula

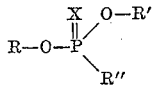

In this and succeeding formulae, R represents 4-hydroxybutenyl or 4-hydroxybutynyl, R' represents lower alkyl, R" represents amino or lower alkyl amino and X represents oxygen or sulfur. In the present specification and claims, the expression "lower alkyl" is employed to refer to the alkyl radicals containing from 1 to 5 carbon atoms, inclusive. These compounds are liquid materials which are somewhat soluble in many common organic solvents and of low solubility in water. The compounds are useful as herbicides and parasiticides and are adapted to be employed as active toxic constituents in compositions for the control of many plants, mites, insects, and bacterial and fungal organisms such as worms, ticks, aphids, Daphnia and Alternaria solani.

The novel compounds of the present invention are prepared by reacting an O-lower alkyl phosphoramidochloridate or phosphoramidochloridothioate corresponding to the formula

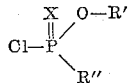

with an alkali metal mono-salt of an alcohol corresponding to the formula ROH. The reaction conveniently is carried out in an inert organic liquid such as benzene, methylene chloride, diethyl ether, and carbon tetrachloride. The amounts of the reagents to be employed are not critical, some of the desired product being obtained when employing any proportions of the reagents. In the preferred method of operations, good results are obtained when employing substantially equimolecular proportions of the alkali metal alcoholate compound and O-alkyl phosphoramidochloridate or phosphoramidochloridothioate. The reaction takes place smoothly at the temperature range of from 0° to 80° C. with the production of the desired product and chloride of reaction. This chloride appears in the reaction mixture as alkali metal chloride. In carrying out the reaction, the reactants are contacted and mixed together in any convenient fashion and the resulting mixture maintained for a period of time in the reaction temperature range to insure completion of the reaction. Following the reaction, the reaction mixture is filtered and the reaction medium removed from the filtrate by evaporation or vacuum distillation to obtain the desired product as a residue.

The following examples merely illustrate the invention and are not to be construed as limiting.

*Example 1.—O-(4-Hydroxy-2-Butenyl) O-Methyl N-Methyl Phosphoramidothioate*

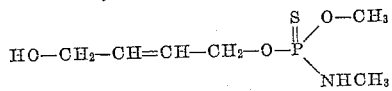

2-butene-1,4-diol (46 grams; 0.523 mole) is added portionwise with stirring to 11.5 grams (0.5 mole) of sodium dispersed in about 18 milliliters of toluene and 500 milliliters of benzene to prepare the monosodium salt of 2-butene-1,4-diol. The addition is carried out over a period of one hour and at a temperature of from 25°–35° C. O-methyl N-methyl phosphoramidochloridothioate (80 grams; 0.5 mole) is dissolved in 400 milliliters of benzene and the resulting mixture added portionwise with stirring to the above prepared solution of the mono-sodium derivative. The addition is carried out over a period of 1½ hours and at a temperature of from 26.5–33.5° C. Stirring is thereafter continued over a period of 4 hours and the mixture allowed to come to room temperature. The reaction mixture is thereafter filtered and the reaction medium removed from the filtrate by fractional distillation under reduced pressure up to a temperature of 45° C. at 30 millimeters pressure to obtain an O-(4-hydroxy-2-butenyl) O-methyl N-methyl phosphoramidothioate product as a liquid residue having a refractive index of n/D of 1.521 at 25° C., a specific gravity of 1.270 at 24°/4° C. and a phosphorus content of 15.9 percent.

*Example 2.—O-(4-Hydroxy-2-Butynyl) O-Methyl N-Methyl Phosphoramidothioate*

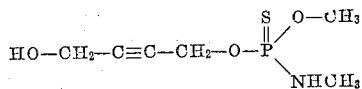

2-butyne-1,4-diol (54 grams; 0.63 mole) is added portionwise with stirring to 9.2 grams (0.4 mole) of sodium dispersed in about 23 millimeters of toluene and 500 milliliters of benzene to produce a dispersion of the mono-sodium salt of 2-butyne-1,4-diol. The addition is carried out over a period of 6 hours and at a temperature of 45°–50° C. Stirring is thereafter continued for 16 hours at 45°–50° C. and 64 grams (0.4 mole) of O-methyl N-methyl phosphoramidochloridothioate thereafter added portionwise thereto. The addition is carried out over a period of 2 hours with stirring and at a temperature of from 25°–30° C. The reaction mixture is then filtered, the reaction medium removed from the filtrate by fractional distillation under reduced pressure and the residue thereafter washed with carbon bisulfide. As a result of these operations, there is obtained an O-(4-hydroxy-2-butynyl) O-methyl N-methyl phosphoramidothioate product as a liquid residue having a refractive index n/D of 1.535 at 25° C., and sulfur and phosphorus contents of 15.4 percent and 14.8 percent, respectively, as compared to theoretical contents of 15.3 percent and 14.82 percent.

*Example 3.—O-(4-Hydroxy-2-Butynyl) O-Methyl Phosphoramidate*

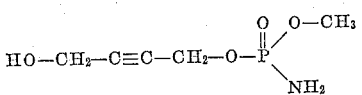

O-methyl phosphoramidochloridate (81.6 grams; 0.63 mole) is added portionwise with stirring to about 0.63 mole of the mono-sodium salt of 2-butyne-1,4-diol dispersed in 400 milliliters of benzene. The benzene dispersion of the mono-sodium salt is prepared in the manner as described in Example 1. The addition is carried out over a period of 2 hours and at a temperature of 10°–20° C. The reaction mixture is thereafter stirred for 4 hours at room temperature to complete the reaction. Following completion of the reaction, the mixture is filtered and the reaction medium removed from the filtrate by distillation under reduced pressure to obtain an O-(4-hydroxy-2-butynyl) O-methyl phosphoramidate product as a liquid residue having a molecular weight of 180 and a phosphorus content of 17 percent.

*Example 4.—O-(4-Hydroxy-2-Butynyl) O-Butyl Phosphoramidothioate*

O-butyl phosphoramidochloridothioate (22.5 grams; 0.12 mole) is added portionwise with stirring to a solution containing about 0.116 mole of the mono-sodium salt of 2-butyne-1,4-diol in 300 milliliters of benzene prepared in the manner as described in Example 1. The addition is carried out over a period of 20 minutes and at a temperature of 20°–28° C. Stirring is thereafter continued for one hour and the reaction mixture allowed to stand over night to insure completion of the reaction. The mixture is then filtered and the reaction medium removed from the filtrate by fractional distillation under reduced pressure to obtain an O-(4-hydroxy-2-butynyl) O-butyl phosphoramidothioate product as a liquid residue having a refractive index $n/D$ of 1.521 at 25° C.

In a similar manner, other products of the present invention are prepared as follows:

O-(4-hydroxy-2-butynyl) O-amyl phosphoramidate (molecular weight of 237; phosphorus content of 13 percent) by reacting together the mono-potassium salt of 2-butyne-1,4-diol and O-amyl phosphoramidochloridate.

O-(4-hydroxy-2-butenyl) O-ethyl N-dibutyl phosphoramidate (molecular weight of 306; phosphorus content of 10 percent) by reacting together the mono-sodium salt of 2-butene-1,4-diol and O-ethyl N-dibutyl phosphoramidochloridate.

O-(4-hydroxy-2-butenyl) O-propyl N-diamyl phosphoramidothioate (molecular weight of 364; sulfur content of 8.6 percent) by reacting together the mono-potassium salt of 2-butene-1,4-diol and O-propyl N-diamyl phosphoramidochloridothioate.

O-(4-hydroxy-2-butynyl) O-methyl N-ethyl phosphoramidothioate (molecular weight of 225; phosphorus content of 14 percent) by reacting together the mono-sodium salt of 2-butyne-1,4-diol and O-methyl N-ethyl phosphoramidochloridothioate.

O-(4-hydroxy-2-butynyl) O-ethyl N-methyl phosphoramidate (molecular weight of 205; phosphorus content of 15.0 percent) by reacting together the mono-potassium salt of 2-butyne-1,4-diol and O-ethyl N-methyl phosphoramidochloridate.

O-(4-hydroxy-2-butenyl) O-ethyl N-methyl phosphoramidate (molecular weight of 210; phosphorus content of 14.5 percent) by reacting together the mono-potassium salt of 2-butene-1,4-diol and O-ethyl N-methyl phosphoramidochloridate.

The novel compounds of the present invention are useful as herbicides and parasiticides for the control of a number of pests. For such uses, the products are dispersed on an inert finely divided solid such as chalk or talc or a finely divided solid surface active dispersing agent and the resulting products employed as dusts. Such mixtures may also be dispersed in water with or without the aid of a surface active agent and employed as sprays. In other procedures, the products are employed as active constituents in solvent solutions, oil-in-water or water-in-oil emulsions or aqueous dispersions. In representative operations, aqueous compositions containing 500 parts per million by weight of O-(4-hydroxy-2-butynyl) O-methyl N-methyl phosphoramidothioate give 100 percent controls of 2-spotted spider mites and *Puccinia graminis tritici*. In additional operations, the application of O-(4-hydroxy-2-butynyl) O-butyl phosphoramidothioate to soil at a dosage of 50 pounds per acre gives substantially complete controls of German millet.

The O-lower alkyl phosphoramidochloridates and phosphoramidochloridothioates employed as starting materials in accordance with the teachings of the present application are prepared in known procedures by reacting two molecular proportions of ammonia or a suitable amine with one molecular proportion of an O-lower alkyl phosphorodichloridate or phosphorodichloridothioate at a temperature of from —20°–30° C. Upon completion of the reaction, the desired starting material is separated by conventional methods. The O-lower alkyl phosphorodichloridates and phosphorodichloridothioates are prepared according to known methods by reacting phosphorus oxychloride or phosphorus thiochloride with a suitable alkanol at temperatures of from 10°–60° C.

I claim:
1. A compound corresponding to the formula

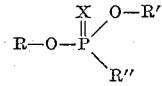

wherein R represents a member of the group consisting of 4-hydroxybutenyl and 4-hydroxybutynyl, R' represents lower alkyl, R" represents a member of the group consisting of amido, mono-lower alkyl amido and di-lower alkyl amido and X represents a member of the group consisting of oxygen and sulfur.

2. O-(4-hydroxy-2-butenyl) O-methyl N-methyl phosphoramidothioate.
3. O-(4-hydroxy-2-butynyl) O-methyl N-methyl phosphoramidothioate.
4. O - (4 - hydroxy - 2 - butynyl) O-methyl phosphoramidate.
5. O-(4-hydroxy-2-butynyl) O-butyl phosphoramidothioate.
6. O-(4-hydroxy-2-butynyl) O-methyl N-methyl phosphoramidate.
7. O-(4-hydroxy-2-butynyl) O-ethyl N-methyl phosphoramidate.

References Cited in the file of this patent
UNITED STATES PATENTS
2,894,019    Maeder  _____ July 7, 1959
FOREIGN PATENTS
592,764    Canada  _____ Feb. 16, 1960
1,085,524    Germany  _____ July 21, 1960